Jan. 28, 1969

W. S. PEPPLER 3,423,901

SHRINK CAPPING METHOD AND APPARATUS

Filed July 6, 1965

INVENTOR
WILLIAM S. PEPPLER

BY Karl W. Flocks

ATTORNEY

INVENTOR
WILLIAM S. PEPPLER
BY KARL W. FLOCKS
ATTORNEY

Jan. 28, 1969 W. S. PEPPLER 3,423,901
SHRINK CAPPING METHOD AND APPARATUS
Filed July 6, 1965 Sheet 4 of 4

INVENTOR
WILLIAM S. PEPPLER
BY Karl W. Flocks
ATTORNEY

United States Patent Office 3,423,901
Patented Jan. 28, 1969

3,423,901
SHRINK CAPPING METHOD AND APPARATUS
William S. Peppler, Chappaqua, N.Y., assignor to Diamond International Corporation, New York, N.Y., a corporation of Delaware
Filed July 6, 1965, Ser. No. 469,693
U.S. Cl. 53—42                                                           15 Claims
Int. Cl. B65b 53/02, 11/54

ABSTRACT OF THE DISCLOSURE

The present disclosure relates to a method and apparatus for applying a shrink cover to a container, an oversized sheet of heat shrinkable transparent plastic film is placed over the open end of the container with the film edges draping over the sides. The container is passed between two vertical belts which press the opposite vertical side walls of the container and grasp the loose film therebetween. In the meantime, heat is applied from below the belts to heat shrink the film edges about the container sides. The belts serve as a shield to prevent the heat from reaching the upper portions of the film. As the package is conveyed further by the vertical belts it then passes to a zone where heat is applied from beneath to shrink the leading and trailing edges of the package.

---

The present invention is directed to a shrink capping method and apparatus and, more particularly, to a method and apparatus for applying a shrinkable plastic film or cover sheet to an open ended container to more suitable retain and protect the contents of the container.

Machines have been provided for the shrink capping of containers, such as shallow trays, for the general purpose of the present invention. However, such machines and their methods of operation have not been entirely satisfactory for a number of reasons. These devices usually employ a variety of schemes to cover the top of the applied plastic film to retain it in place on the open container. Thus, the patent to Carpenter et al., No. 3,034,271, utilizes belts to hold down and shield the plastic film, the belts acting on the top of the container. With the belts of Carpenter et al., it is difficult if not impossible to successfully operate when the contents of the container extend above its top.

Among the other devices which have attempted to solve such problems are those shown in the patents to Harrison No. 3,115,735 and Snow, Jr., et al., No. 3,120,728. The devices of these patents use draping blankets or screens to cover the upper portion of the plastic film. These devices have not been entirely successful since they are relatively expensive and are not capable of running under sufficiently high speeds to provide a high production output.

It is therefore an object of the present invention to provide a novel method and apparatus for applying a shrink cover to an open container which overcomes the deficiencies in the prior art, such as those deficiencies indicated above.

It is another object of the present invention to apply a heat shrinkable covering material to a container having a product therein which extends above the height of the container walls.

It is another object of the present invention to protect the product from heat which is used to shrink the cover.

It is another object of the present invention to protect the upper portions of the shrinkable cover film from shrinking while the edges thereof are shrunk about the container side walls.

It is another object of the present invention to provide an apparatus for applying shrink covers which apparatus can be easily adjusted to receive containers of various sizes.

It is another object of the present invention to provide an apparatus which is both inexpensive and yet which is capable of high production output.

It is another object of the present invention to effect shrink capping where film exposure to shrinkage is limited to portions of the film periphery where the shrinkage can be readily controlled.

These and other objects and the nature and advantages of the present invention will become apparent from the following description taken in conjunction with the accompanying drawings wherein.

The present invention generally involves the use of very localized heat sources along the path of package travel to shrink preselected portions of an overdraped plastic film to form a band under the perimeter of the container lip. After the band is formed to secure the plastic cover, additional heat may be applied from the bottom and/or top to further tighten the band, or contour the top of the cover.

Figure 1:
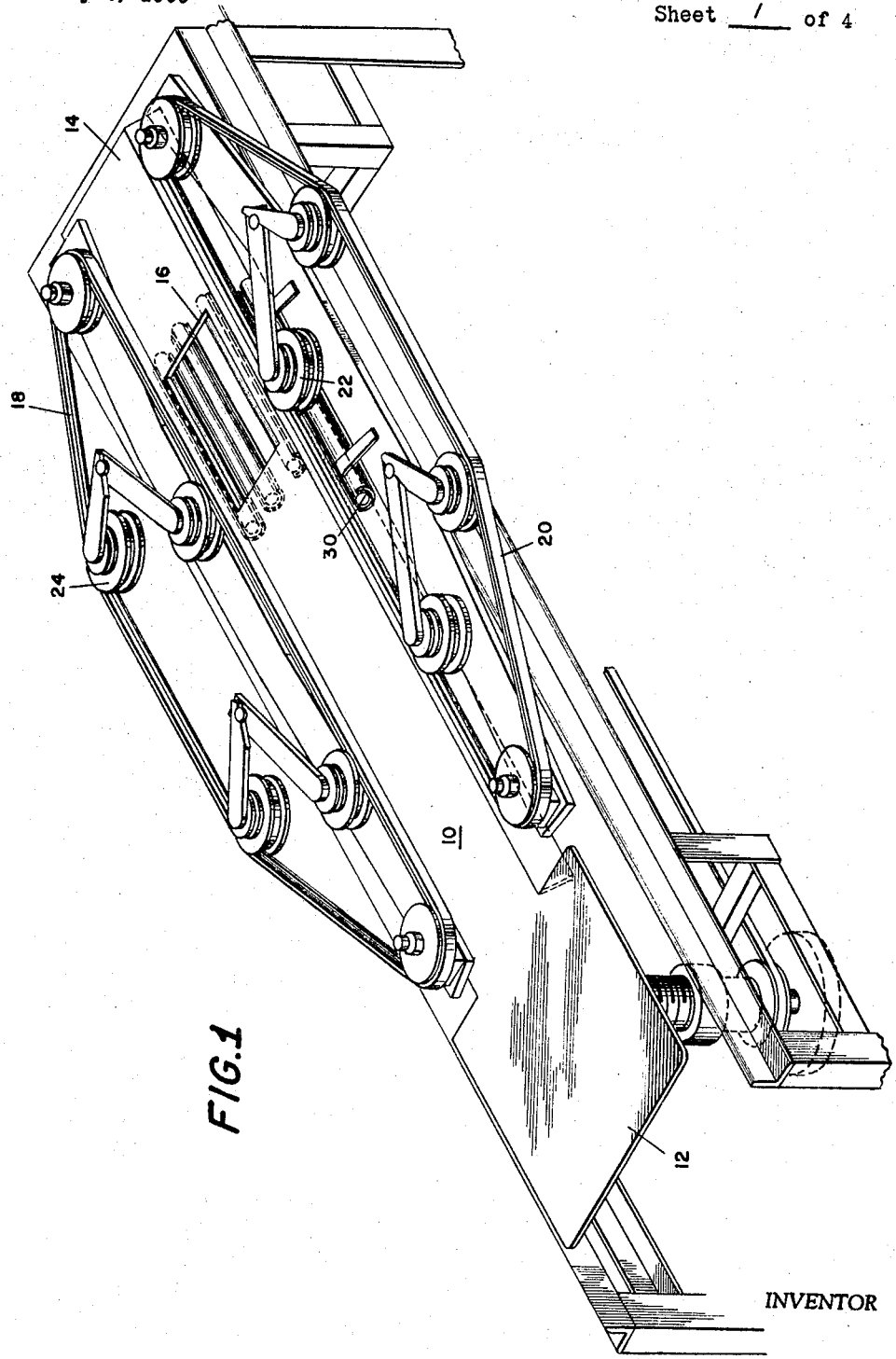
FIG. 1 is a perspective view of an apparatus in accordance with the present invention.
Figure 2:
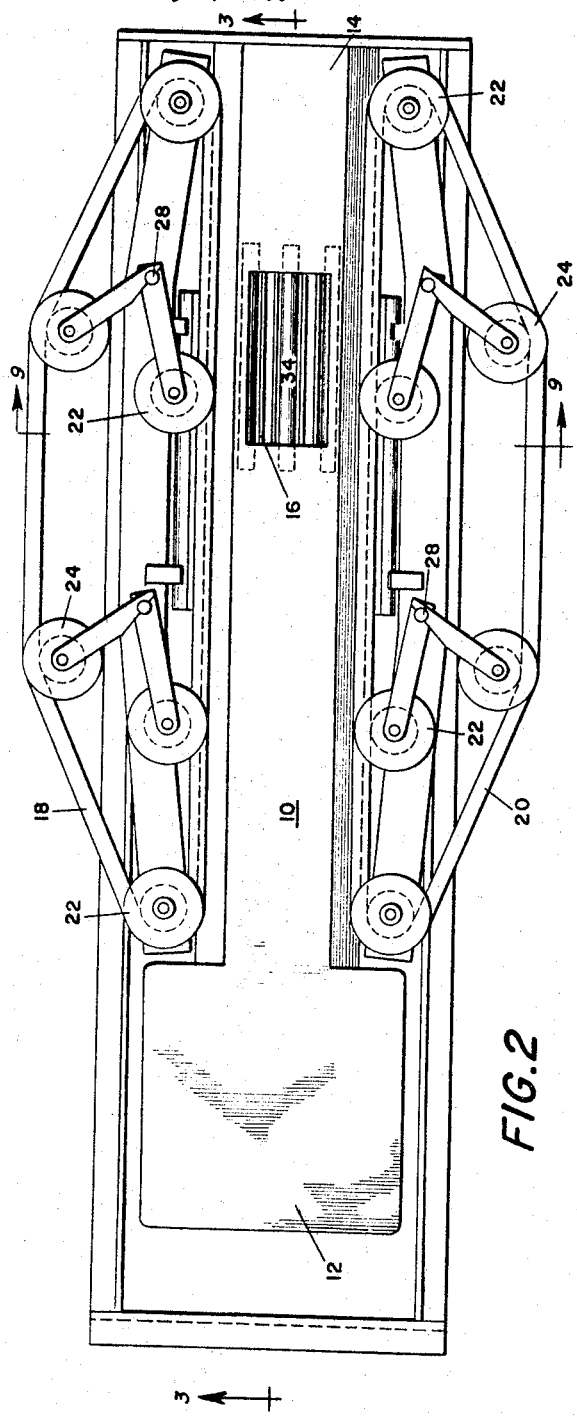
FIG. 2 is a plan view of the apparatus of FIG. 1.
Figure 3:
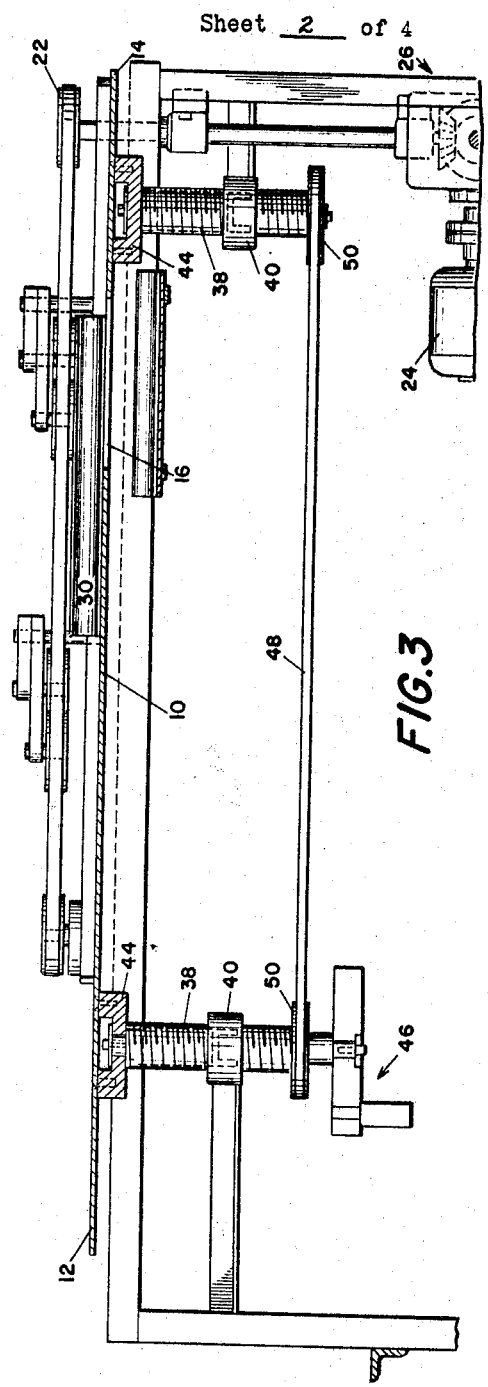
FIG. 3 is a sectional view taken along line 3—3 of FIG. 2.

Apparatus for carrying out the present invention is shown in FIG. 1 and includes a suitable means 10 to support a container 60 and its contents during processing in accordance with the present invention. The means preferably comprises a stationary slider bed over which the container 60 may slide, the slider bed 10 having an upstream end 12 and a downstream end 14. Along its length and provided at the lateral center thereof is a suitable opening 16 nearer the downstream end 14 than the upstream end 12, the purpose of which will be explained below. Although any suitable means may be utilized to support the container during its travel, the slider bed 10 is preferred because of its simplified structure, low cost and because it is highly effective. A movable support, such as an endles conveyor belt, if used in place of the slider bed 10 would require an endless longitudinal opening dow nits center or a plurality of closely spaced openings to take the place of the opening 16.

Placed along the length of the slider bed 10 and in facing relationship to one another are two endless conveyor belts 18 and 20, each being supported by a plurality of pressing rollers 22 and tension rollers 24. The belts 18 and 20 are adapted to convey the container 60 along the slider bed 10 by pressing opposite sides of the container between the belts. Any one of the rolls for each belt, preferably a pressing roll 22, may be driven by a suitable motor 24 through suitable linkage means 26. The tension in the belts 18 and 20 may be maintained to a desired degree by any suitable means, such as springs or hydraulic or pneumatic means, urging the rollers 22 and 24 apart about a pivot point 28. The belts 18 and 20, along with their supporting rollers, may be moved towards and away from each other to accommodate therebetween containers of different widths.

While the belts 18 and 20 are the preferred means of conveying the container, it will be recognized that other conveying means may be used, such as pusher lugs or bars which act on the sides of the container. If a bottom conveyor belt is used in place of the slider bed 10, then suitable shields, either stationary or moving must be used such as shown in FIG. 6B.

Figure 9:
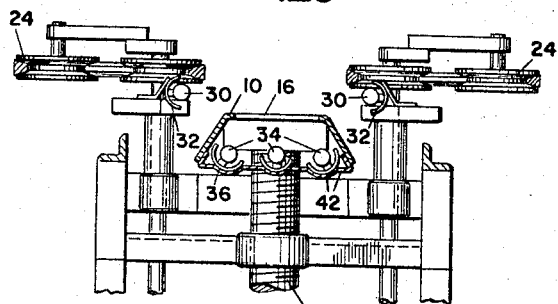
FIG. 9 is a sectional view along line 9—9 of FIG.2.

Provided along the length of the slider bed 10 are a pair of facing first radiant heaters 30 which are disposed immediately below the belts 18 and 20 as shown in FIG. 9. Suitable reflectors 32 are provided behind the radiant heaters 30 to control the area of application of the radiant heat and direct the heat in a plane parallel to the slider bed 10 and below the belts 18 and 20. The radiant heaters 30 and the reflectors 32 are connected to the supporting structure of the rollers 22 as most clearly shown in FIG. 9 and when adjustment is made of the belts to increase or decrease the space therebetween, the heaters 30 and reflectors 32 move therewith.

Disposed partially downstream from the first heaters 30 are second radiant heaters 34 which are disposed beneath the opening 16 and are backed by reflectors 36. The slider bed 10 and the secondary heaters 34 and reflectors 36 are mounted integrally through a supporting member 42 and may be moved as a unit vertically up and down to adjust the apparatus for containers of different heights. Such up and down adjustment may be effected through a pair of threaded bolt members 38 which support the slider bed and which are adapted to rotate in a pair of rigid internally threaded nut members 40, the bolt members 38 being rotatably supported within anchor members 44 which in turn are rigidly secured to the underside of the slider bed 10. The bolt members 38 are turned to raise and lower the slider bed 10 by turning a crank member 46. The two bolt members 38 are connected for simultaneously turning by a suitable belt 48 which passes about pulleys 50 concentric and rigidly attached to the bolts 38. Although one suitable means is here shown for raising and lowering the slider bed 10 to accommodate containers of different heights, it will be understood that any means accomplishing the same function will be suitable.

Having thus generally described an apparatus suitable for carrying out the process of the present invention, the following detailed description is more specifically concerned with the process itself.

Generally, the process involves the type of packaging known as shrink cover packaging. Here a container, preferably a paperboard or molded pulp tray 60 of rectangular configuration, having opposite side walls 70, a leading or downstream wall 72 and a trailing or upstream wall 74, is filled with a suitable product such as fruit 62. Generally, such trays 60 are shallow and the contents packaged therein extend above the top of the tray defined by the lips 64. The general process involves broadly placing a heat shrinkable transparent plastic film 66 over the top of the filled container 60 and then restraining the film 66 in such a manner so that the edges thereof may be shrunk to peripheral dimensions smaller than the periphery of the lip 64.

To carry out the general process in accordance with the present invention, a suitable container 60 containing the desired product 62 is delivered to the slider bed 10 at the upstream portion 12. Depending on the size of the tray, the distance between the facing conveyor belts 18 and 20 is adjusted so that such conveyors will press against either the side walls 70 of the container 60 or the lips 64 thereof. Similarly, depending on the height of the container, and whether it is desired to contact either the lips 64 or the side walls 70 of the container 60, the slider bed 10 is adjusted vertically in relation to the plane of the conveyor belts 18 and 20.

Figure 4:
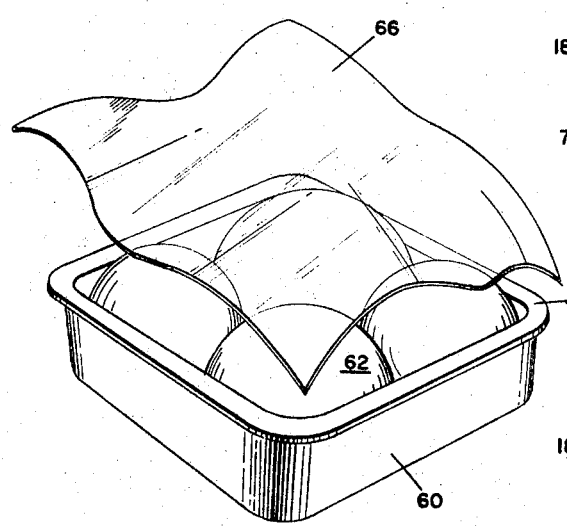
FIG. 4 is a perspective view of a container, contents and a loose plastic film covering being applied thereto.
Figure 6:
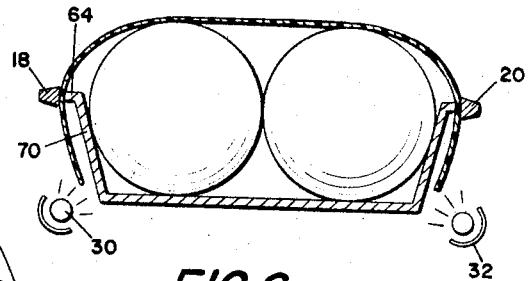
FIGS. 5, 6, 7 and 8 are sectional views of the container, contents and cover of FIG. 4 during successive steps of the process.
Figure 5:
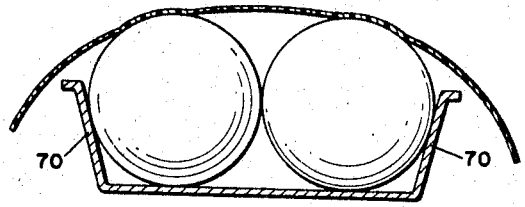
Figures 10, 11:
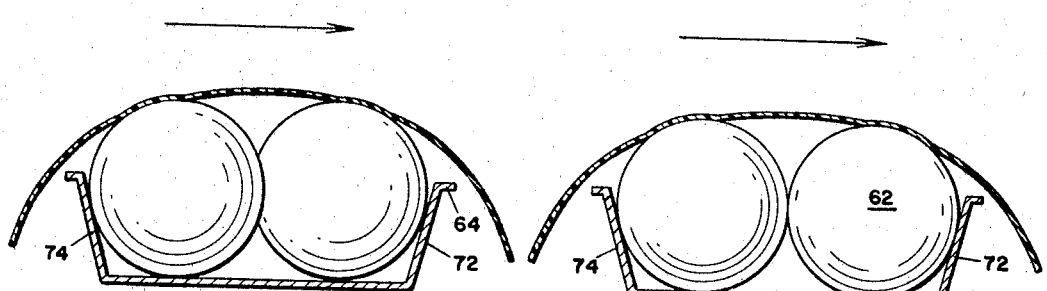
FIGS. 10–13 are sectional views taken through the container of FIG. 4 during the successive stages illustrated in FIGS. 5–8, respectively, said sectional views being taken at an angle 90° to those of FIGS. 5–8.

At the upstream end 12 of the slider bed 10, a plastic film 66 having heat shrinkable properties and of sufficient dimensions to drape over the entire container, is placed on the upper open end of the container 60 as shown in FIG. 4. Immediately prior to contact by the conveyor belts 18 and 20, the film is draped as shown in FIGS. 5 and 10, FIG. 5 corresponding to a cross section taken through the composite laterally to the direction of travel and FIG. 10 corresponding to a cross section longitudinal to the direction of travel. As the lips 64 of the container 60 are pressed by the conveyor belts 18 and 20, the plastic film is grasped therebetween as shown in FIG. 6, the edges of the film being gathered adjacent the walls 70 into a downwardly pointing position ready for heat treatment. In the meantime, both the leading and trailing edges of the container are free as is shown in FIG. 11.

Figure 7:
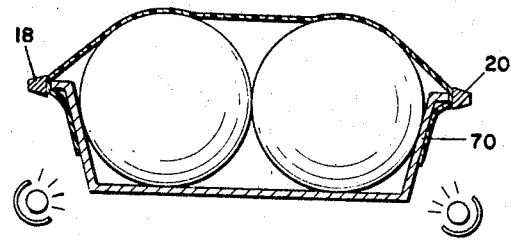
Figures 12, 13:
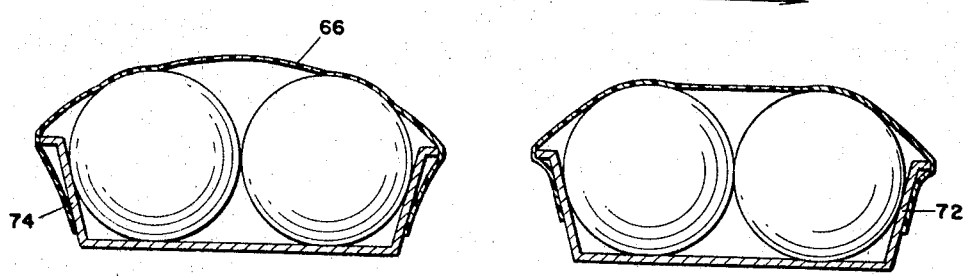

The belts 18 and 20 convey the container in this manner to a point adjacent the first heaters 30 which heat the film below the lips 64 of the tray adjacent side walls 70 and effect shrinkage thereof. While these opposite sides of the film are being heated, the film edges disposed 90° from the heated portions and adjacent walls 72 and 74 are not being heated. As soon as the heat begins to take effect on the film edges adjacent side walls 70, the edges begin to draw in against the sides of the container as shown in FIG. 7. This shrinkage of opposite side edges of the film causes the leading and trailing edges of the film adjacent walls 72 and 74, respectively, to pull down due to a gathering action which is the result of a reduction in the total periphery about the film and this is shown in FIG. 12. In FIG. 12 the leading and trailing edges have, as yet, not been subjected to heat.

Figure 8:
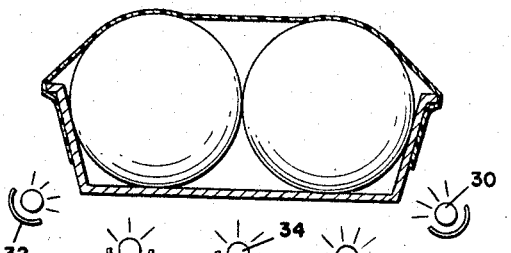

If desired, the package may be removed from the apparatus at this point. Preferably, however, the leading and trailing edges of the film are also subjected to heat to effect shrinkage thereof to further secure the closure. This is accomplished by the radiant heaters 34 acting through the opening 16 in the slider bed 10. The effect of these heaters is shown in FIGS. 8 and 12, it being clear that heat from the radiant heaters 34 will act first on the adjacent wall 72 leading edge, and then on the trailing edge adjacent wall 74 of the container 40.

If desired, heat can subsequently be applied to the top of package or to the entire package if still further tightening and contouring of the plastic cover 66 is desired. This may be accomplished in a manner known in the art by passing the package into an oven.

The present invention involves the use of very localized heat sources along the path of travel of the container and the conveyors 18 and 20 serve not only to convey the container over the slider bed 10, but also in part serve as a shield to prevent heat from reaching the top of the shrinkable plastic film 66 from the first heaters 30. The localized heaters have the effect of shrinking preselected portions of the plastic film to form a band under the perimeter of the container lip 64.

Figure 7A:
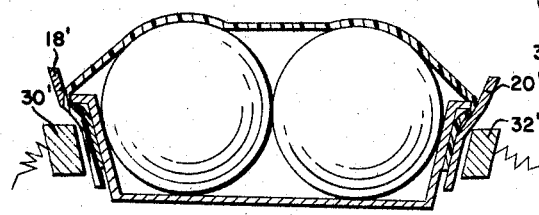
FIGS. 7A and 7B are sectional views similar to FIG. 7 showing other embodiments.

As shown in FIG. 7A, spring-loaded heaters 30′–32′ may be used in place of the radiant heaters. In this instance, the conveying belts 18′–20′ are wide and thin and formed of a heat-resistant material such as tetrafluoroethylene impregnated fiberglass. The heat thereby passes from the heaters 30′–32′ through the belts 18′–20′ by conduction and then to the selected depending portions of the plastic film to effect shrinkage.

Figure 7B:
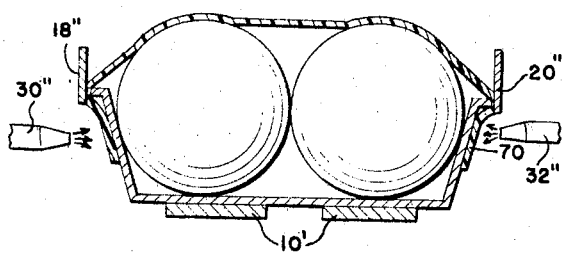

In the embodiment shown in FIG. 7B, small jets 30″–32″ are used in place of the radiant heaters. Hot air under very low kinetic energy is blown from the jets 30″–32″ to shrink the film along the container side-walls without heating the film above the lips of the container. The low kinetic energy of the hot air is essential because the hot air must not carry across the width of the container since this would effect heating of the film adjacent the leading and trailing walls 72 and 74 of the container with the result that the film would shrink in the areas above the lip 64 of the container; this undesirable shrinkage would tend to pull the edge portions of the film over the container lip 64 before sufficient desirable shrinkage beneath the shields or belts 18″–20″ can anchor the edges under the lip 64. In this embodiment the shields 18″–20″ may be movable belts or may be stationary in which case a supporting belt 10′ would be necessary for conveying.

It will be obvious to those skilled in the art that various changes may be made without departing from the scope of the invention and therefore the invention is not limited to what is shown in the drawings and described in the specification but only as indicated in the appended claims.

What is claimed is:

1. A method of packaging comprising depositing the material to be packaged in a container; placing an oversized sheet of heat shrinkable transparent plastic film over the open end of said container and contents with the film edges draping loosely over the sides of said container; conveying said container and simultaneously pressing opposite generally vertical side walls of said container and grasping the loose film to press it against said opposite side walls by passing the container, contents and draped film between two facing vertical belts; and applying heat from below said belts to heat shrink the film edges about said opposite container sides to form a package while shielding the upper portions of said film from heat, said belts serving to effect said shielding.

2. A method in accordance with claim 1 including applying heat to the edge portions of said film disposed 90° from said belts after heating the edges adjacent said opposite sides.

3. A method in accordance with claim 2 wherein said heating of said film edges disposed 90° from said belt involves passing said container over a second heating element.

4. A method in accordance with claim 1 further comprising uniformly heating said package to further shrink said film.

5. A method in accordance with claim 1 wherein said contents extend above the top of said tray.

6. A method in accordance with claim 1 wherein said belts press said container side walls at the lip portions thereof.

7. A method in accordance with claim 1 wherein said belts convey said container, contents and film.

8. Packaging apparatus for shrinking a plastic film comprising: means to support a container, contents and film draped thereover; means to convey said container over said supporting means including two facing conveyer belts adapted to press opposite side walls of said container, said belts being adapted to grasp the plastic film therebetween and press it against said opposite side walls; and means below said belts to apply heat to the plastic film portions extending below the upper portions of said container while said container is being conveyed; the heating from said heating means causing said extending film portions to shrink into engagement with the side portions of the said container, said belts serving to shield the upper portions of said plastic film from heat.

9. A device in accordance with claim 12 wherein said container support means comprises a stationary slider bed.

10. A device in accordance with claim 8 wherein said film extends below said belts and said heating means directs heat to said film portions extending below said belts.

11. A device in accordance with claim 10 wherein said heating means comprise localized radiant heaters disposed directly beneath said belts.

12. A device in accordance with claim 10 wherein said heating means comprise low kinetic energy hot air jet means.

13. A device in accordance with claim 8 wherein said belts are wide, thin and heat-resistant and said heating means comprise heated platens which contact the outer surfaces of said belts at the bottom thereof.

14. Packaging apparatus for shrinking a plastic film comprising: means to slidably support a container, contents and film draped thereover; means both to shield the upper portions of said film and container and to convey same including a pair of facing movable shields adapted to pass said container therebetween with the draped film portions extending below said shields along opposite sides of said container; and means to apply heat to the film portions extending below said shields along said opposite sides.

15. Packaging apparatus for shrinking a plastic film comprising:
 means to support a container, contents and film draped thereover, said support means comprising a stationary slider bed, said slider bed defining an opening in the lateral center thereof;
 means to convey said container over said supporting means including two facing conveyor belts adapted to press opposite sides of said container, said belts being adapted to grasp the plastic film therebetween and press said opposite sides;
 means to apply heat to the plastic film portions extending below the upper portions of said container while said container is being conveyed, the heating from said heating means causing said extending film portions to shrink into engagement with the side portions of the said container, said belts serving to shield the upper portions of said plastic film from heat; and
 a second heating means disposed beneath said opening to heat and shrink the leading and trailing edges of said plastic film not treated by said first mentioned heating means.

References Cited

UNITED STATES PATENTS

| | | | |
|---|---|---|---|
| 2,581,309 | 1/1952 | Stephano | 53—379 |
| 3,034,271 | 5/1962 | Carpenter et al. | 53—379 X |
| 3,120,728 | 2/1964 | Snow et al. | 53—42 |
| 3,279,144 | 10/1966 | Larson | 53—30 |
| 3,362,128 | 1/1968 | James | 53—30 X |

TRAVIS S. McGEHEE, *Primary Examiner.*

R. L. FARRIS, *Assistant Examiner.*

U.S. Cl. X.R.

53—329, 184